(12) United States Patent
Zhu et al.

(10) Patent No.: US 11,933,921 B2
(45) Date of Patent: Mar. 19, 2024

(54) METHOD AND SYSTEM FOR PROCESSING OBSTACLE DETECTION RESULT OF ULTRASONIC SENSOR ARRAY

(71) Applicant: Beijing Baidu Netcom Science and Technology Co., Ltd., Beijing (CN)

(72) Inventors: Xiaoxing Zhu, Beijing (CN); Xiang Liu, Beijing (CN); Fan Yang, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 489 days.

(21) Appl. No.: 17/278,248

(22) PCT Filed: Dec. 18, 2019

(86) PCT No.: PCT/CN2019/126392
§ 371 (c)(1),
(2) Date: Mar. 19, 2021

(87) PCT Pub. No.: WO2020/147500
PCT Pub. Date: Jul. 23, 2020

(65) Prior Publication Data
US 2022/0035015 A1 Feb. 3, 2022

(30) Foreign Application Priority Data
Jan. 15, 2019 (CN) .......................... 201910034451.X

(51) Int. Cl.
*G01S 7/52* (2006.01)
*G01S 15/42* (2006.01)
(Continued)

(52) U.S. Cl.
CPC .......... *G01S 7/52004* (2013.01); *G01S 15/42* (2013.01); *G01S 15/931* (2013.01); *G01S 17/42* (2013.01);
(Continued)

(58) Field of Classification Search
CPC .... G01S 7/52004; G01S 15/42; G01S 15/931; G01S 17/42; G01S 17/931;
(Continued)

(56) References Cited

U.S. PATENT DOCUMENTS

2005/0195383 A1  9/2005  Breed et al.
2008/0046150 A1* 2/2008  Breed ................. B60R 21/0134
                                                          701/45
(Continued)

FOREIGN PATENT DOCUMENTS

CN    103415782 A    11/2013
CN    104412087 A     3/2015
(Continued)

OTHER PUBLICATIONS

European Supplemental Search Report, Application No. EP19910456, PCT/CN2019126392, dated Nov. 14, 2021, 8 pages.
(Continued)

*Primary Examiner* — Tung S Lau
(74) *Attorney, Agent, or Firm* — Kwan & Olynick LLP

(57) ABSTRACT

The present disclosure provides a method and system for processing an obstacle detection result of an ultrasonic sensor array. The method comprises: obtaining obstacle coordinates collected by ultrasonic sensors in an ultrasonic sensor array; inputting the obstacle coordinates collected by ultrasonic sensors in the ultrasonic sensor array into a pre-trained neural network model, to obtain true or false labels for the obstacle coordinates collected by the ultrasonic sensors output by the pre-trained neural network model; process the obstacle coordinates collected by the ultrasonic sensors in the ultrasonic sensor array according to the true or false labels. The present disclosure improves the accuracy in (Continued)

the obstacle detection of the ultrasonic sensor array, avoids detection error and omission and improves the driving safety.

14 Claims, 4 Drawing Sheets

(51) Int. Cl.
   *G01S 15/931* (2020.01)
   *G01S 17/42* (2006.01)
   *G01S 17/931* (2020.01)
   *G06N 3/08* (2023.01)
(52) U.S. Cl.
   CPC .............. *G01S 17/931* (2020.01); *G06N 3/08* (2013.01); *G01S 2015/938* (2013.01)
(58) Field of Classification Search
   CPC ...... G01S 2015/938; G01S 15/86; G01S 7/52; G06N 3/08; G06N 3/044; G06N 3/045
   See application file for complete search history.

(56) References Cited

U.S. PATENT DOCUMENTS

| | | | |
|---|---|---|---|
| 2008/0266052 A1* | 10/2008 | Schmid | G01S 7/52004 340/5.1 |
| 2009/0033540 A1* | 2/2009 | Breed | G08G 1/163 701/472 |
| 2018/0122067 A1 | 5/2018 | Reicher et al. | |
| 2018/0211128 A1 | 7/2018 | Hotson et al. | |
| 2018/0314921 A1 | 11/2018 | Mercep et al. | |
| 2019/0049958 A1* | 2/2019 | Liu | G01S 17/00 |
| 2019/0258251 A1* | 8/2019 | Ditty | B60W 50/023 |
| 2021/0103755 A1 | 4/2021 | Hotson et al. | |

FOREIGN PATENT DOCUMENTS

| | | |
|---|---|---|
| CN | 105303179 A | 2/2016 |
| CN | 105738908 A | 7/2016 |
| CN | 105922990 A | 9/2016 |
| CN | 107526085 A | 12/2017 |
| CN | 107942335 A | 4/2018 |
| CN | 108845324 A | 11/2018 |
| CN | 108909624 A | 11/2018 |
| CN | 109116374 A | 1/2019 |
| CN | 109870698 A | 6/2019 |
| DE | 102017108348 B3 | 6/2018 |
| JP | H03188391 A | 8/1991 |
| JP | H06174839 A | 6/1994 |
| JP | 2000098031 A | 4/2000 |
| JP | 2016065750 A | 4/2016 |
| WO | 2018127498 A1 | 7/2018 |

OTHER PUBLICATIONS

JP2021-518846 Notice of Allowance, 3 pages.
Notice of Allowance, Application CN201910034451.X, dated Sep. 28, 2021, 3 pages.
PCT International Search Report and Written Opinion with Translation of ISR for PCT/CN2019/126392 dated Mar. 27, 2020, 12 pages.
First Office Action and Search Report with English Translation for Chinese Application No. 201910034451.X, dated Jul. 13, 2020,16 pages.
Second Office Action with English Translation for Chinese Application No. 201910034451.X, dated Dec. 14, 2020,14 pages.

* cited by examiner

METHOD AND SYSTEM FOR PROCESSING OBSTACLE DETECTION RESULT OF ULTRASONIC SENSOR ARRAY

This application is a national-phase application claiming the priority of PCT application No. PCT/CN2019/126392, filed Dec. 18, 2019, which claims the priority to Chinese Patent Application No. 201910034451.X, filed on Jan. 15, 2019, and entitled "Method and System for Processing Obstacle Detection Result of Ultrasonic Sensor Array" The disclosure of the above applications is incorporated herein by reference in its entirety.

FIELD OF THE DISCLOSURE

The present disclosure relates to the field of automatic control, and particularly to a method and system for processing an obstacle detection result of an ultrasonic sensor array.

BACKGROUND OF THE DISCLOSURE

Unmanned vehicles are a kind of intelligent vehicles, also referred to as wheeled mobile robots, and implement unmanned driving mainly depending on an intelligent driving instrument in the vehicle with a computer system as a core. The unmanned vehicle integrates many techniques such as automatic control, architecture, artificial intelligence and vision computing, are products of advanced development of computer sciences, mode recognition and intelligent control techniques, are also an important index for measuring a country's science and technological power and industrial level, and have a broad application prospect in the fields such as national defense and national economy.

An ultrasonic radar is usually mounted on an unmanned vehicle to achieve an obstacle-avoiding function. However, the working principles of the ultrasonic radar itself cause a low detection precision and are liable to cause detection error or detection omission.

SUMMARY OF THE DISCLOSURE

An aspect of the present disclosure provides a method for processing an obstacle detection result of an ultrasonic sensor array, comprising:
   obtaining obstacle coordinates collected by ultrasonic sensors in the ultrasonic sensor array;
   inputting the obstacle coordinates collected by ultrasonic sensors in the ultrasonic sensor array into a pre-trained neural network model, to obtain true or false labels for the obstacle coordinates collected by the ultrasonic sensors output by the pre-trained neural network model;
   processing the obstacle coordinates collected by the ultrasonic sensors in the ultrasonic sensor array according to the true or false labels.

The above aspect and any possible implementation further provide an implementation: the inputting the obstacle coordinates collected by ultrasonic sensors in the ultrasonic sensor array into a pre-trained neural network model comprises:
   selecting feature values of to-be-processed obstacle coordinates collected by an ultrasonic sensor and its adjacent N ultrasonic sensors to generate a data sequence, where N is a positive integer smaller than the total number of the ultrasonic sensors in the ultrasonic sensor array;
   inputting the data sequence to the pre-trained neural network model.

The above aspect and any possible implementation further provide an implementation: the neural network model is trained by the following steps:
   building an obstacle test scenario;
   obtaining and unifying the obstacle coordinates collected by the ultrasonic sensors in the ultrasonic sensor array and the coordinates of the same obstacle collected by a LiDAR into a reference coordinate system;
   performing true or false labeling for the obstacle coordinates collected by the ultrasonic sensors according to the obstacle coordinates collected by the unified LiDAR, and generating training samples;
   training the neural network model according to the training samples.

The above aspect and any possible implementation further provide an implementation: the performing true or false labeling for the obstacle coordinates collected by the ultrasonic sensors according to the obstacle coordinates collected by the unified LiDAR comprises:
   if an error between the obstacle coordinates collected by the LiDAR and the obstacle coordinates collected by the ultrasonic sensors is within a preset threshold range, labeling the obstacle coordinates as true; if the error is greater than the preset threshold range, labeling the obstacle coordinates as false.

The above aspect and any possible implementation further provide an implementation: the generating training samples comprises:
   generating the training samples according to the feature values of to-be-processed obstacle coordinates collected by an ultrasonic sensor and its adjacent N ultrasonic sensors and the true or false labels for the to-be-processed obstacle coordinates collected by the ultrasonic sensors.

The above aspect and any possible implementation further provide an implementation: the neural network model is a convolutional neural network model.

The above aspect and any possible implementation further provide an implementation: the neural network model is a Long Short-Term Memory neural network model.

The above aspect and any possible implementation further provide an implementation: the training the neural network model according to the training samples comprises:
   training the Long Short-Term Memory neural network model by using a plurality of training samples obtained at continuous time.

Another aspect of the present disclosure provides a system for processing an obstacle detection result of an ultrasonic sensor array, comprising:
   an obtaining module configured to obtain obstacle coordinates collected by ultrasonic sensors in an ultrasonic sensor array;
   a neural network labeling module configured to input the obstacle coordinates collected by ultrasonic sensors in the ultrasonic sensor array into a pre-trained neural network model, to obtain true or false labels for the obstacle coordinates collected by the ultrasonic sensors output by the pre-trained neural network model;
   a processing module configured to process the obstacle coordinates collected by the ultrasonic sensors in the ultrasonic sensor array according to the true or false labels.

The above aspect and any possible implementation further provide an implementation: the neural network labeling module is specifically configured to:

select feature values of to-be-processed obstacle coordinates collected by an ultrasonic sensor and its adjacent N ultrasonic sensors to generate a data sequence, where N is a positive integer smaller than the total number of the ultrasonic sensors in the ultrasonic sensor array;

input the data sequence to the pre-trained neural network model.

The above aspect and any possible implementation further provide an implementation: the system further comprises a neural network training module configured to:

build an obstacle test scenario;

obtain and unify the obstacle coordinates collected by the ultrasonic sensors in the ultrasonic sensor array and the coordinates of the same obstacle collected by a LiDAR into a reference coordinate system;

perform true or false labeling for the obstacle coordinates collected by the ultrasonic sensors according to the obstacle coordinates collected by the unified LiDAR, and generate training samples;

train the neural network model according to the training samples.

The above aspect and any possible implementation further provide an implementation: the performing true or false labeling for the obstacle coordinates collected by the ultrasonic sensors according to the obstacle coordinates collected by the unified LiDAR comprises:

if an error between the obstacle coordinates collected by the LiDAR and the obstacle coordinates collected by the ultrasonic sensors is within a preset threshold range, labeling the obstacle coordinates as true; if the error is greater than the preset threshold range, labeling the obstacle coordinates as false.

The above aspect and any possible implementation further provide an implementation: the generating training samples comprises:

generating the training samples according to the feature values of to-be-processed obstacle coordinates collected by an ultrasonic sensor and its adjacent N ultrasonic sensors and the true or false labels for the to-be-processed obstacle coordinates collected by the ultrasonic sensors.

The above aspect and any possible implementation further provide an implementation: the neural network model is a convolutional neural network model.

The above aspect and any possible implementation further provide an implementation: the neural network model is a Long Short-Term Memory neural network model.

The above aspect and any possible implementation further provide an implementation: the training the neural network model according to the training samples comprises:

training the Long Short-Term Memory neural network model by using a plurality of training samples obtained at continuous time.

A further aspect of the present invention provides a computer device, comprising a memory, a processor and a computer program which is stored on the memory and runs on the processor, the processor, upon executing the program, implementing the above-mentioned method.

A further aspect of the present invention provides a computer-readable storage medium on which a computer program is stored, the program, when executed by the processor, implementing the aforesaid method.

As known from the above technical solutions, embodiments of the present disclosure improve the accuracy in the ultrasonic sensor array obstacle detection, avoid detection error and omission and improve the driving safety.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

A plurality of aspects of the present disclosure provide a method and system for processing an obstacle detection result of an ultrasonic sensor array, to improve the accuracy in the ultrasonic sensor array obstacle detection, avoid detection error and omission and improve the driving safety.

Figure 1:
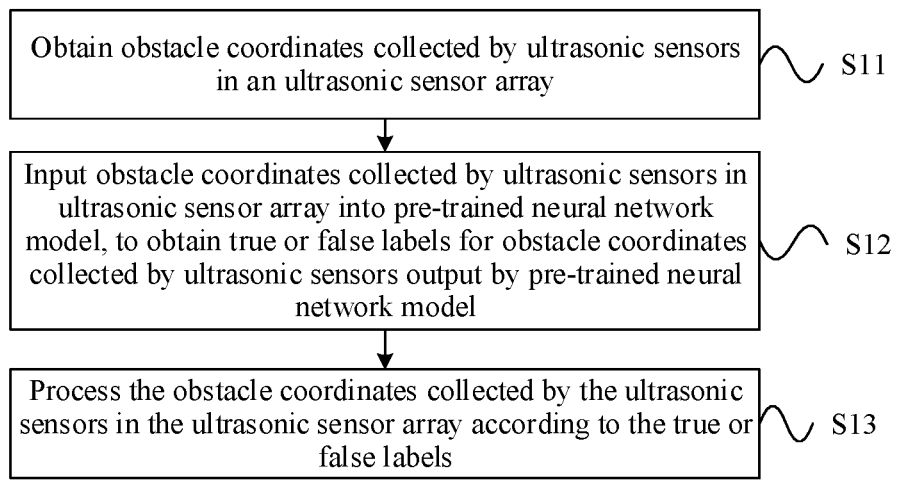
FIG. 1 is a flow chart of a method for processing an obstacle detection result of an ultrasonic sensor array according to an embodiment of the present disclosure.

FIG. 1 is a flow chart of a method for processing an obstacle detection result of an ultrasonic sensor array according to an embodiment of the present disclosure. As shown in FIG. 1, the method comprises the following steps:

Step S11: obtaining obstacle coordinates collected by ultrasonic sensors in an ultrasonic sensor array;

Step S12: inputting the obstacle coordinates collected by ultrasonic sensors in the ultrasonic sensor array into a pre-trained neural network model, to obtain true or false labels for the obstacle coordinates collected by the ultrasonic sensors output by the pre-trained neural network model;

Step S13: processing the obstacle coordinates collected by the ultrasonic sensors in the ultrasonic sensor array according to the true or false labels.

Preferably, in a preferred implementation of step S11, obstacle coordinates collected by ultrasonic sensors in the ultrasonic sensor array are obtained.

Preferably, in the present embodiment, thoughts are only given to the case in which there is a single obstacle in the field of vision of the ultrasonic sensor array, and the scenario is clean so that what are returned by the ultrasonic sensors are obstacle coordinates collected for the same obstacle.

Preferably, since the ultrasonic sensors in the ultrasonic sensor array are evenly distributed on a front bumper of the vehicle, the coordinate systems of the ultrasonic sensors are different. It is necessary to unify the obstacle coordinates collected by the ultrasonic sensors into a reference coordinate system. In the present embodiment, the coordinates of the ultrasonic sensors may be converted into the vehicle coordinate system.

In a preferred implementation of step S12,
the obstacle coordinates collected by the ultrasonic sensors in the ultrasonic sensor array are input into a pre-trained neural network model, to obtain true or false labels for the obstacle coordinates collected by the ultrasonic sensors output by the pre-trained neural network model.

Preferably, the ultrasonic sensor array includes 10 ultrasonic sensors evenly distributed on the front bumper of the vehicle. In practical application, generally at most 4-6 adjacent ultrasonic sensors may collect the coordinates of the same obstacle. For example, when the obstacle appears on the left forward side of the vehicle, it is possible that only four ultrasonic sensors distributed on the left side of the front bumper of the vehicle collect the coordinates of the obstacle, and return the obstacle information. However, 6 ultrasonic sensors distributed in the middle and right side of the front bumper of the vehicle fail to collect the obstacle information.

In a preferred embodiment of the present embodiment,
the obstacle coordinates collected by one ultrasonic sensor and its adjacent N ultrasonic sensors are selected from the obstacle coordinates collected by all ultrasonic sensors to generate a data sequence, where N is a positive integer smaller than the total number of the ultrasonic sensors in the ultrasonic sensor array, and the data sequence is input to the pre-trained neural network; labeling results output by the pre-trained neural network are obtained, and the authenticity of the obstacle coordinates collected by the selected one ultrasonic sensor is determined. The pre-trained neural network is a CNN convolutional neural network.

In another preferred embodiment of the present embodiment,
the obstacle coordinates collected by one ultrasonic sensor and its adjacent N ultrasonic sensors are selected from the obstacle coordinates collected by all ultrasonic sensors to generate a data sequence, where N is a positive integer smaller than the total number of the ultrasonic sensors in the ultrasonic sensor array, and the data sequence at time t is input to the pre-trained neural network; labeling results at time t output by the pre-trained neural network are obtained, and the authenticity of the obstacle coordinates collected by the selected one ultrasonic sensor is determined. The pre-trained neural network is a LSTM (Long Short-Term Memory) neural network. Preferably, the data sequence at the time t is substituted into the LSTM neural network to calculate an LSTM result at the time t, and the authenticity of the obstacle coordinates collected by the selected one ultrasonic sensor is determined. Preferably, whilst the data sequence at the time t is received at the LSTM neural network, LSTM hidden layer states from time t−1 to time t−n have already been stored, and an LSTM hidden layer state satisfying a preset rule may be selected from the LSTM hidden layer states from time t−1 to time t−n according to the preset rule, as a selection result for calculating the LSTM result at the time t.

In the embodiment of the present invention, the preset rule may include but not limited to: select at least one most different LSTM hidden layer state from the LSTM hidden layer states from time t−1 to time t−n as the selection result; and/or, select at least one LSTM hidden layer state from the LSTM hidden layer states from time t−1 to time t−n by using sparseness of a L0-norm; and/or select at least one LSTM hidden layer state from the LSTM hidden layer states from time t−1 to time t−n according to artificial experience. It may be appreciated that as for the above preset rule, a corresponding selection rule may be designed according to actual needs (e.g., a new task).

In a preferred embodiment of step S13,
the obstacle coordinates collected by the ultrasonic sensors in the ultrasonic sensor array are processed according to the true or false labels.

Preferably, if the labeling result output by the pre-trained neural network model is true, the to-be-processed obstacle coordinates collected by ultrasonic sensors will be retained; if the labeling result output by the pre-trained neural network model is false, the to-be-processed obstacle coordinates collected by ultrasonic sensors will be discarded.

Preferably, the obstacle is avoided according to the processed obstacle coordinates.

Preferably, it is feasible to simultaneously employ the CNN convolutional neural network and the LSTM neural network to respectively output a labeling result, and perform weighted summation to determine a final labeling result.

Figure 2:
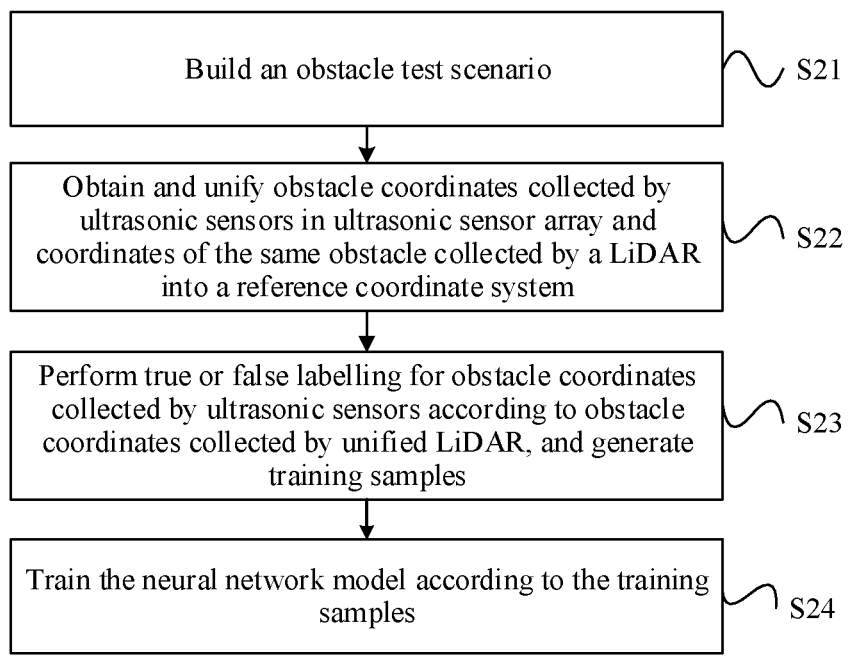
FIG. 2 is a flow chart of a method for training a neural network model in a method for processing an obstacle detection result of an ultrasonic sensor array according to an embodiment of the present disclosure.

As shown in FIG. 2, the neural network model is trained through the following steps:
Step S21: building an obstacle test scenario;
Preferably, the obstacle test scenario is a simple scenario and relatively clean. In the field of vision of the ultrasonic sensor array, a single obstacle is set so that what is returned by the ultrasonic sensors is information about the same obstacle during the process of testing the ultrasonic sensor array;
Step S22: collecting and unifying the coordinates of the obstacle collected by the ultrasonic sensor array and the coordinates of the same obstacle collected by a LiDAR into the reference coordinate system;
Preferably, the ultrasonic sensors in the ultrasonic sensor array are evenly distributed on the front bumper of the vehicle; the LiDAR is a single-line LiDAR mounted at a central position of the front bumper of the vehicle, and the LiDAR is used to collect precise distance data of the obstacle to serve as true values of the obstacle coordinates collected by the ultrasonic sensors, and label the true values.

Preferably, since the ultrasonic sensors in the ultrasonic sensor array are evenly distributed on the front bumper of the vehicle, and the LiDAR is mounted at a central position of the front bumper of the vehicle, it is necessary to convert the coordinates in an ultrasonic sensor coordinate system and coordinates in a LiDAR coordinate system into the reference coordinate system. In the present embodiment, the coordinates in the LiDAR coordinate system and coordinates in the ultrasonic sensor coordinate system may be converted into the vehicle coordinate system in a unified manner.

Initial space configurations of the ultrasonic sensors and the LiDAR are already known in advance and may be obtained according to measurement data of the ultrasonic sensors and the LiDAR on the body of the unmanned vehicle. The coordinates of the obstacle in the ultrasonic sensor coordinate systems and the coordinates in the LiDAR coordinate system are converted into the vehicle coordinate system.

Step S23: labeling the obstacle coordinates collected by the ultrasonic sensors according to the obstacle coordinates collected by the unified LiDAR, and generating training samples;

Preferably, the obstacle coordinates collected by the ultrasonic sensors are labeled according to the obstacle coordinates collected by the unified LiDAR, by labeling the obstacle coordinates collected by the ultrasonic sensors as true or false.

Regarding ultrasonic sensor #1 in the ultrasonic sensor array, if an error between the distance data returned by the LiDAR and the distance data returned by the ultrasonic sensor #1 is within a preset threshold range, the obstacle coordinates are labeled as true; if the error is greater than the preset threshold range, the obstacle coordinates are labeled as false, and it is believed that detection error or omission happens to the ultrasonic sensor #1. Preferably, the preset threshold range is 20 cm and may cover about 99% output.

Feature values of obstacle coordinates collected by N ultrasonic sensors adjacent to ultrasonic sensor #1 are determined. Preferably, N is a positive integer smaller than the total number of ultrasonic sensors in the ultrasonic sensor array. Preferably, the ultrasonic sensor array include 10 ultrasonic sensors evenly distributed on the front bumper of the vehicle. In practical application, generally at most 4-6 adjacent ultrasonic sensors may collect the coordinates of the same obstacle. For example, when the obstacle appears on the left forward side of the vehicle, it is possible that only four ultrasonic sensors distributed on the left side of the front bumper of the vehicle collect the coordinates of the obstacle, and return the obstacle information, whereas 6 ultrasonic sensors distributed in the middle and right side of the front bumper of the vehicle fail to collect the obstacle information. Hence, N may be selected as four. Although N may take a larger value, the obstacle coordinates collected by more sensors are less related to the obstacle coordinates collected by the ultrasonic sensor #1, and the only thing is that the amount of operations is increased. Hence, it is feasible that four sensor are generally selected.

The feature values of obstacle coordinates collected by N ultrasonic sensors adjacent to ultrasonic sensor #1 are obtained by changing features of the obstacle coordinates, e.g., averaging or calculating a square root.

Preferably, training samples are generated according to the feature values of N ultrasonic sensors adjacent to ultrasonic sensor #1 and the label of the ultrasonic sensor #1.

A positive sample is meant by the label marked as true, and a negative sample is meant by the label marked as false.

Preferably, training samples are generated according to the feature values of N ultrasonic sensors adjacent to ultrasonic sensor #1 and the label of the ultrasonic sensor #1 at continuous time.

By testing in the obstacle testing scenario, it is possible to automatically obtain a lot of testing samples for the ultrasonic sensors without need to manually label using a device such as a laser rangefinder, thereby substantially improving the obtaining speed and precision of the testing samples.

Step S24: training the neural network model according to the training samples.

In a preferred embodiment of the present embodiment, the neural network model is a CNN convolutional neural network model. The CNN convolutional network model is trained with training samples with labels, including positive samples and negative samples.

Preferably, the plurality of samples are trained using a SGD (Stochastic Gradient Descent) training algorithm to finally obtain parameters of the CNN.

Preferably, training samples are generated according to the feature values and labels of N ultrasonic sensors adjacent to different ultrasonic sensors in the ultrasonic sensor array to train the CNN convolutional neural network. In the method for processing an obstacle detection result of an ultrasonic sensor array, to-be-corrected obstacle detection results of different ultrasonic sensors are labeled using the trained CNN convolutional neural network corresponding thereto, and corresponding labeling results are labels of the obstacle detection results thereof. If the labeling result output by the pre-trained neural network model is true, the obstacle will be avoided according to the collected obstacle coordinates; if the labeling result output by the pre-trained neural network model is false, the collection result is discarded, and the obstacle is avoided by taking a new collection result.

In another preferred implementation of the present embodiment, the neural network model is an LSTM neural network model. A plurality of training samples with labels obtained at continuous time are used to train the LSTM neural network model.

The training samples are used to train the LSTM neural network model. Training values of parameters of the LSTM neural network are determined from initial values of the parameters by optimizing (namely, maximizing or minimizing) an objective function.

According to the technical solution provided by the above embodiment, the result returned by the LiDAR is taken as a true value of the ultrasonic sensor array detection to label the obstacle detection result of an ultrasonic sensor array, the labeled obstacle detection results are taken as training samples to train the neural network model, and the ultrasonic obstacle detection results are corrected according to the trained neural network model, thereby improving the accuracy in the obstacle detection of the ultrasonic sensor array, avoiding detection error and omission and improving the driving safety.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above introduces the method embodiments. The solution of the present disclosure will be further described through an apparatus embodiment.

Figure 3:
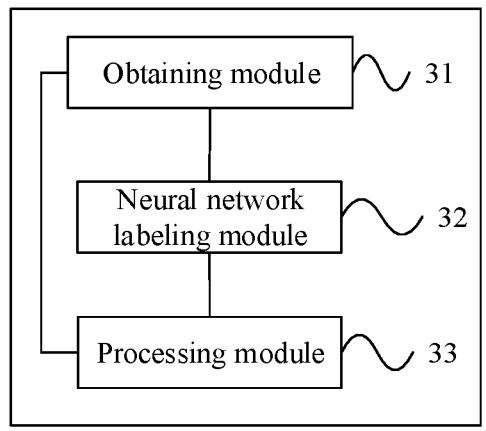
FIG. 3 is a structural schematic diagram of a system for correcting an obstacle detection result of an ultrasonic sensor array according to an embodiment of the present disclosure.
Figure 4:
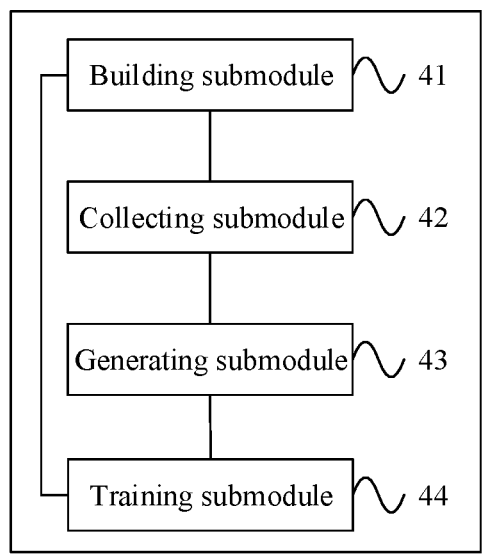
FIG. 4 is a structural schematic diagram of a training module of a system for correcting an obstacle detection result of an ultrasonic sensor array according to an embodiment of the present disclosure.

FIG. 3 is a structural schematic diagram of a system for correcting an obstacle detection result of an ultrasonic sensor array according to an embodiment of the present disclosure. As shown in FIG. 3, the system comprises:

an obtaining module 31 configured to obtain obstacle coordinates collected by ultrasonic sensors in an ultrasonic sensor array;

a neural network labeling module 32 configured to input the obstacle coordinates collected by ultrasonic sensors in the ultrasonic sensor array into a pre-trained neural network model, to obtain true or false labels for the obstacle coordinates collected by the ultrasonic sensors output by the pre-trained neural network model;

a processing module 33 configured to process the obstacle coordinates collected by the ultrasonic sensors in the ultrasonic sensor array according to the true or false labels.

Preferably, in a preferred implementation of the obtaining module 31, the obtaining module 31 obtains obstacle coordinates collected by ultrasonic sensors in an ultrasonic sensor array.

Preferably, in the present embodiment, thoughts are only given to the case in which there is a single obstacle in the field of vision of the ultrasonic sensor array, and the scenario is clean so that what are returned by the ultrasonic sensors are obstacle coordinates collected for the same obstacle.

Preferably, since the ultrasonic sensors in the ultrasonic sensor array are evenly distributed on a front bumper of the vehicle, the coordinate systems of the ultrasonic sensors are different. It is necessary to unify the obstacle coordinates collected by the ultrasonic sensors into a reference coordinate system. In the present embodiment, the coordinates of the ultrasonic sensors may be converted into a vehicle coordinate system.

In a preferred implementation of the neural network labeling module 32, the neural network labeling module 32 inputs the obstacle coordinates collected by the ultrasonic sensors in the ultrasonic sensor array into a pre-trained neural network model, to obtain true or false labels for the obstacle coordinates collected by the ultrasonic sensors output by the pre-trained neural network model.

Preferably, the ultrasonic sensor array includes 10 ultrasonic sensors evenly distributed on the front bumper of the vehicle. In practical application, generally at most 4-6 adjacent ultrasonic sensors may collect the coordinates of the same obstacle. For example, when the obstacle appears on the left forward side of the vehicle, it is possible that only four ultrasonic sensors distributed on the left side of the front bumper of the vehicle collect the coordinates of the obstacle, and return the obstacle information. However, 6 ultrasonic sensors distributed in the middle and right side of the front bumper of the vehicle fail to collect the obstacle information.

In a preferred embodiment of the present embodiment, the obstacle coordinates collected by one ultrasonic sensor and its adjacent N ultrasonic sensors are selected from the obstacle coordinates collected by all ultrasonic sensors to generate a data sequence, where N is a positive integer smaller than the total number of the ultrasonic sensors in the ultrasonic sensor array, and the data sequence is input to the pre-trained neural network; labeling results output by the pre-trained neural network are obtained, and the authenticity of the obstacle coordinates collected by the selected one ultrasonic sensor is determined. The pre-trained neural network is a CNN convolutional neural network.

In another preferred embodiment of the present embodiment, the obstacle coordinates collected by one ultrasonic sensor and its adjacent N ultrasonic sensors are selected from the obstacle coordinates collected by all ultrasonic sensors to generate a data sequence, where N is a positive integer smaller than the total number of the ultrasonic sensors in the ultrasonic sensor array, and the data sequence at time t is input to the pre-trained neural network; labeling results at time t output by the pre-trained neural network are obtained, and the authenticity of the obstacle coordinates collected by the selected one ultrasonic sensor is determined. The pre-trained neural network is a LSTM (Long Short-Term Memory) neural network. Preferably, the data sequence at the time t is substituted into the LSTM neural network to calculate an LSTM result at the time t, and the authenticity of the obstacle coordinates collected by the selected one ultrasonic sensor is determined. Preferably, whilst the data sequence at the time t is received at the LSTM neural network, LSTM hidden layer states from time t−1 to time t−n have already been stored, and an LSTM hidden layer state satisfying a preset rule may be selected from the LSTM hidden layer states from time t−1 to time t−n according to the preset rule, as a selection result for calculating the LSTM result at the time t.

In the embodiment of the present invention, the preset rule may include but not limited to: select at least one most different LSTM hidden layer state from the LSTM hidden layer states from time t−1 to time t−n as the selection result; and/or, select at least one LSTM hidden layer state from the LSTM hidden layer states from time t−1 to time t−n by using sparseness of a L0-norm; and/or select at least one LSTM hidden layer state from the LSTM hidden layer states from time t−1 to time t−n according to artificial experience. It may be appreciated that as for the above preset rule, a corresponding selection rule may be designed according to actual needs (e.g., a new task).

In a preferred embodiment of the processing module 33, the processing module 33 is configured to process the obstacle coordinates collected by the ultrasonic sensors in the ultrasonic sensor array according to the true or false labels.

Preferably, if the labeling result output by the pre-trained neural network is true, the to-be-processed obstacle coordinates collected by ultrasonic sensors will be retained; if the labeling result output by the pre-trained neural network is false, the to-be-processed obstacle coordinates collected by ultrasonic sensors will be discarded.

Preferably, the obstacle is avoided according to the processed obstacle coordinates.

Preferably, it is feasible to simultaneously employ the CNN convolutional neural network and the LSTM neural network to respectively output an labeling result, and perform weighted summation to determine a final labeling result.

The system further comprises a training module (not shown in the figure) configured to train the neural network model, the training module comprising the following submodules:

a building submodule 41 configured to build an obstacle test scenario;

Preferably, the obstacle test scenario is a simple scenario and relatively clean. In the field of vision of the ultrasonic sensor array, a single obstacle is set so that what is returned by the ultrasonic sensors is information about the same obstacle during the process of testing the ultrasonic sensor array;

a collecting submodule 43 configured to collect and unify the coordinates of the obstacle collected by the ultrasonic sensor array and the coordinates of the same obstacle collected by a LiDAR into the reference coordinate system;

Preferably, the ultrasonic sensors in the ultrasonic sensor array are evenly distributed on the front bumper of the vehicle; the LiDAR is a single-line LiDAR mounted at a central position of the front bumper of the vehicle, and the LiDAR is used to collect precise distance data of the obstacle to serve as true values of the obstacle coordinates collected by the ultrasonic sensors, and label the true values.

Preferably, since the ultrasonic sensors in the ultrasonic sensor array are evenly distributed on the front bumper of the vehicle, and the LiDAR is mounted at a central position of the front bumper of the vehicle, it is necessary to convert the coordinates in an ultrasonic sensor coordinate system and coordinates in a LiDAR coordinate system into the reference coordinate system. In the present embodiment, the coordinates in the LiDAR coordinate system and coordinates in the ultrasonic sensor coordinate system may be converted into the vehicle coordinate system in a unified manner.

Initial space configurations of the ultrasonic sensors and the LiDAR are already known in advance and may be obtained according to measurement data of the ultrasonic sensors and the LiDAR on the body of the unmanned vehicle. The coordinates of the obstacle in the ultrasonic sensor coordinate systems and the coordinates in the LiDAR coordinate system are converted into the vehicle coordinate system.

a generating submodule 43 configured to label the obstacle coordinates collected by the ultrasonic sensors according to the obstacle coordinates collected by the unified LiDAR, and generate training samples;

Preferably, the obstacle coordinates collected by the ultrasonic sensors are labeled according to the obstacle coordinates collected by the unified LiDAR, by labeling the obstacle coordinates collected by the ultrasonic sensors as true or false.

Regarding ultrasonic sensor #1 in the ultrasonic sensor array, if an error between the distance data returned by the LiDAR and the distance data returned by the ultrasonic sensor #1 is within a preset threshold range, the obstacle coordinates are labeled as true; if the error is greater than the preset threshold range, the obstacle coordinates are labeled as false, and it is believed that detection error or omission happens to the ultrasonic sensor #1. Preferably, the preset threshold range is 20 cm and may cover about 99% output.

Feature values of obstacle coordinates collected by N ultrasonic sensors adjacent to ultrasonic sensor #1 are determined. Preferably, N is a positive integer smaller than the total number of ultrasonic sensors in the ultrasonic sensor array. Preferably, the ultrasonic sensor array include 10 ultrasonic sensors evenly distributed on the front bumper of the vehicle. In practical application, generally at most 4-6 adjacent ultrasonic sensors may collect the coordinates of the same obstacle. For example, when the obstacle appears on the left forward side of the vehicle, it is possible that only four ultrasonic sensors distributed on the left side of the front bumper of the vehicle collect the coordinates of the obstacle, and return the obstacle information, whereas 6 ultrasonic sensors distributed in the middle and right side of the front bumper of the vehicle fail to collect the obstacle information. Hence, N may be selected as four. Although N may take a larger value, the obstacle coordinates collected by more sensors are less related to the obstacle coordinates collected by the ultrasonic sensor #1, and the only thing is that the amount of operations is increased. Hence, it is feasible that four sensor are generally selected.

The obstacle coordinates collected by N ultrasonic sensors adjacent to ultrasonic sensor #1 are selected, and the feature values of the obstacle coordinates are obtained by changing features of the obstacle coordinates, e.g., averaging or calculating a square root.

Preferably, training samples are generated according to the feature values of N ultrasonic sensors adjacent to ultrasonic sensor #1 and the label of the ultrasonic sensor #1.

A positive sample is meant by the label marked as true, and a negative sample is meant by the label marked as false.

Preferably, training samples are generated according to the feature values of N ultrasonic sensors adjacent to ultrasonic sensor #1 and the label of the ultrasonic sensor #1 at continuous time.

By testing in the obstacle testing scenario, it is possible to automatically obtain a lot of testing samples for the ultrasonic sensors without need to manually label using a device such as a laser rangefinder, thereby substantially improving the obtaining speed and precision of the testing samples.

a training submodule 44 configured to train the neural network model according to the training samples.

In a preferred embodiment of the present embodiment, the neural network model is a CNN convolutional neural network model. The CNN convolutional network model is trained with training samples with labels, including positive samples and negative samples.

Preferably, the plurality of samples are trained using a SGD (Stochastic Gradient Descent) training algorithm to finally obtain parameters of the CNN.

Preferably, training samples are generated according to the feature values and labels of N ultrasonic sensors adjacent to different ultrasonic sensors in the ultrasonic sensor array to train the CNN convolutional neural network. In the method for processing an obstacle detection result of ultrasonic sensor array, to-be-corrected obstacle detection results of different ultrasonic sensors are labeled using the trained CNN convolutional neural network corresponding thereto, and corresponding labeling results are labels of the obstacle detection results thereof. If the labeling result output by the pre-trained neural network is true, the obstacle will be avoided according to the collected obstacle coordinates; if the labeling result output by the pre-trained neural network is false, the collection result is discarded, and the obstacle is avoided by taking a new collection result.

In another preferred implementation of the present embodiment, the neural network model is an LSTM neural network model. A plurality of training samples with labels obtained at continuous time are used to train the LSTM neural network model.

The training samples are used to train the LSTM neural network model. Training values of parameters of the LSTM neural network are determined from initial values of the parameters by optimizing (namely, maximizing or minimizing) an objective function.

According to the technical solution provided by the above embodiment, the result returned by the LiDAR is taken as a true value of the ultrasonic sensor array detection to label the obstacle detection result of the ultrasonic sensor array, the labeled obstacle detection results are taken as training samples to train the neural network model, and the ultrasonic obstacle detection results are corrected according to the trained neural network model, thereby improving the accuracy in the obstacle detection of the ultrasonic sensor array, avoiding detection error and omission and improving the driving safety.

In the above embodiments, embodiments are respectively described with different emphasis being placed, and reference may be made to related depictions in other embodiments for portions not detailed in a certain embodiment.

In the embodiments provided by the present invention, it should be understood that the revealed method and apparatus may be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be performed via some interfaces, and indirect coupling or communicative connection of means or units may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present invention, functional units can be integrated in one processing unit, or they can be separate physical presences; or two or more units can be integrated in one unit. The integrated unit described above can be realized in the form of hardware, or they can be realized with hardware and software functional units.

Figure 5:
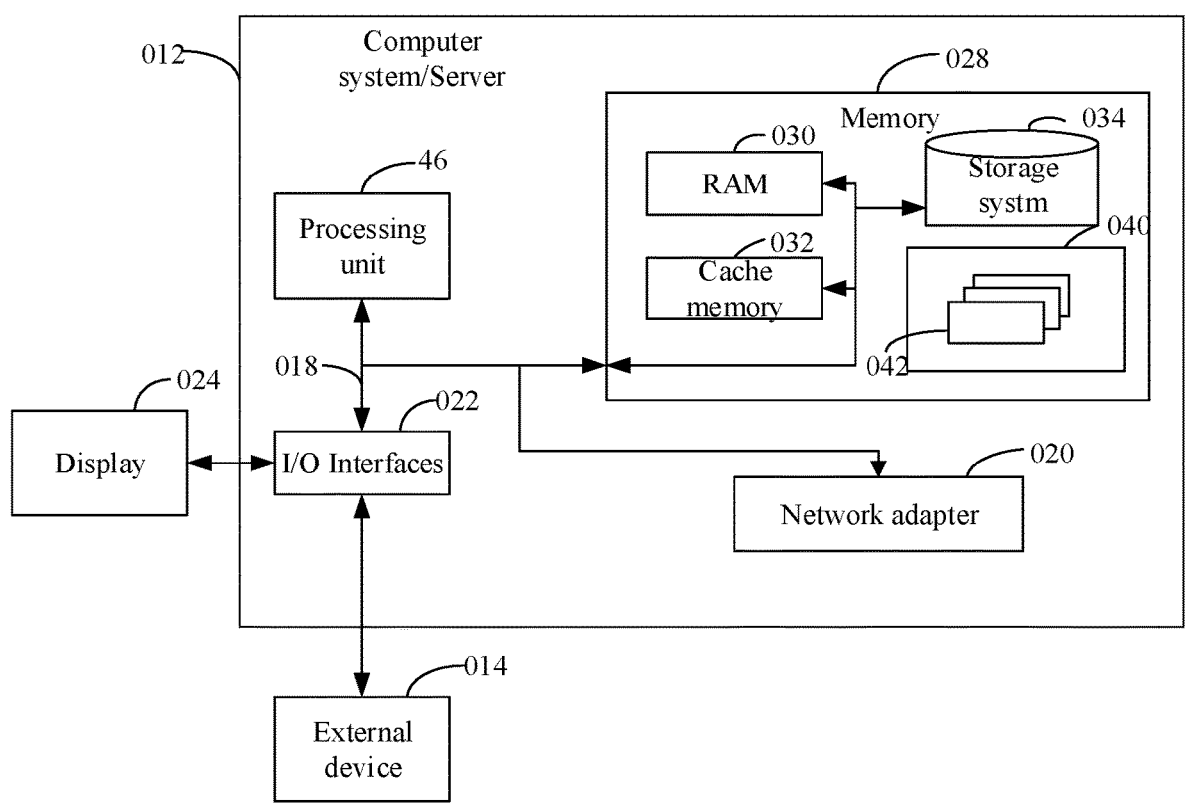
FIG. 5 illustrates a block diagram of an example computer system/server 012 adapted to implement an implementation mode of the present disclosure.

FIG. 5 illustrates a block diagram of an example computer system/server 012 adapted to implement an implementation mode of the present disclosure. The computer system/server 012 shown in FIG. 5 is only an example, and should not bring any limitation to the functions and use scope of the embodiments of the present disclosure.

As shown in FIG. 5, the computer system/server 012 is shown in the form of a general-purpose computing device. The components of the computer system/server 012 may include, but are not limited to, one or more processors or processing units 016, a system memory 028, and a bus 018 that couples various system components including the system memory 028 and the processing unit 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set of (e.g., at least one) program modules that are configured to carry out the functions of embodiments of the present disclosure.

Program/utility 040, having a set of (at least one) program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As shown in the figure, network adapter 020 communicates with the other communication modules of computer system/server 012 via bus 018. It should be understood that although not shown in FIG. 5, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes the functions and/or methods described in the embodiments of the present disclosure by running the programs stored in the system memory 028.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer-implemented method for processing an obstacle detection result of an ultrasonic sensor array of an unmanned vehicle, wherein the method comprises:
    obtaining obstacle coordinates collected by ultrasonic sensors in the ultrasonic sensor array;
    inputting the obstacle coordinates collected by ultrasonic sensors in the ultrasonic sensor array into a pre-trained neural network model, to obtain true or false labels for the obstacle coordinates collected by the ultrasonic sensors output by the pre-trained neural network model;
    processing the obstacle coordinates collected by the ultrasonic sensors in the ultrasonic sensor array according to the true or false labels, and control the unmanned vehicle to avoid obstacle according to the processed obstacle coordinates,
    wherein the neural network model is trained by the following steps:
    building an obstacle test scenario;
    obtaining and unifying the obstacle coordinates collected by the ultrasonic sensors in the ultrasonic sensor array and the coordinates of the same obstacle collected by a LiDAR into a reference coordinate system;
    performing true or false labelling for the obstacle coordinates collected by the ultrasonic sensors according to the obstacle coordinates collected by the unified LiDAR, and generating training samples;
    training the neural network model according to the training samples,
    wherein the performing true or false labelling for the obstacle coordinates collected by the ultrasonic sensors according to the obstacle coordinates collected by the unified LiDAR comprises:
    if an error between the obstacle coordinates collected by the LiDAR and the obstacle coordinates collected by the ultrasonic sensors is within a preset threshold range, labelling the obstacle coordinates as true; if the error is greater than the preset threshold range, labelling the obstacle coordinates as false.

2. The method according to claim 1, wherein the inputting the obstacle coordinates collected by ultrasonic sensors in the ultrasonic sensor array into a pre-trained neural network model comprises:
    selecting feature values of to-be-processed obstacle coordinates collected by an ultrasonic sensor and its adjacent N ultrasonic sensors to generate a data sequence, where N is a positive integer smaller than the total number of the ultrasonic sensors in the ultrasonic sensor array;
    inputting the data sequence to the pre-trained neural network model.

3. The method according to claim 1, wherein the generating training samples comprises:
    generating the training samples according to the feature values of to-be-processed obstacle coordinates collected by an ultrasonic sensor and its adjacent N ultrasonic sensors and the true or false labels for the to-be-processed obstacle coordinates collected by the ultrasonic sensors, where N is a positive integer smaller than the total number of the ultrasonic sensors in the ultrasonic sensor array.

4. The method according to claim 1, wherein the neural network model is a convolutional neural network model.

5. The method according to claim 1, wherein the neural network model is a Long Short-Term Memory neural network model.

6. The method according to claim 2, wherein the processing the obstacle coordinates collected by the ultrasonic sensors in the ultrasonic sensor array according to the true or false labels comprises:
    if the labelling result output by the neural network model is true, retaining the to-be-processed obstacle coordinates collected by ultrasonic sensors;
    if the labelling result output by the neural network model is false, discarding the to-be-processed obstacle coordinates collected by ultrasonic sensors.

7. An electronic device, comprising:
    at least one processor; and
    a memory communicatively connected with the at least one processor;
    wherein the memory stores instructions executable by the at least one processor, and the instructions are executed by the at least one processor to enable the at least one processor to perform a method for processing an obstacle detection result of an ultrasonic sensor array of an unmanned vehicle, wherein the method comprises:

obtaining obstacle coordinates collected by ultrasonic sensors in the ultrasonic sensor array;

inputting the obstacle coordinates collected by ultrasonic sensors in the ultrasonic sensor array into a pre-trained neural network model, to obtain true or false labels for the obstacle coordinates collected by the ultrasonic sensors output by the pre-trained neural network model;

processing the obstacle coordinates collected by the ultrasonic sensors in the ultrasonic sensor array according to the true or false labels, and control the unmanned vehicle to avoid obstacle according to the processed obstacle coordinates, wherein the neural network model is trained by the following steps:

building an obstacle test scenario;

obtaining and unifying the obstacle coordinates collected by the ultrasonic sensors in the ultrasonic sensor array and the coordinates of the same obstacle collected by a LiDAR into a reference coordinate system;

performing true or false labelling for the obstacle coordinates collected by the ultrasonic sensors according to the obstacle coordinates collected by the unified LiDAR, and generating training samples;

training the neural network model according to the training samples, wherein the performing true or false labelling for the obstacle coordinates collected by the ultrasonic sensors according to the obstacle coordinates collected by the unified LiDAR comprises:

if an error between the obstacle coordinates collected by the LiDAR and the obstacle coordinates collected by the ultrasonic sensors is within a preset threshold range, labelling the obstacle coordinates as true; if the error is greater than the preset threshold range, labelling the obstacle coordinates as false.

8. The electronic device according to claim 7, wherein the inputting the obstacle coordinates collected by ultrasonic sensors in the ultrasonic sensor array into a pre-trained neural network model comprises:

selecting feature values of to-be-processed obstacle coordinates collected by an ultrasonic sensor and its adjacent N ultrasonic sensors to generate a data sequence, where N is a positive integer smaller than the total number of the ultrasonic sensors in the ultrasonic sensor array;

inputting the data sequence to the pre-trained neural network model.

9. The electronic device according to claimer 7 wherein the generating training samples comprises:

generating the training samples according to the feature values of to-be-processed obstacle coordinates collected by an ultrasonic sensor and its adjacent N ultrasonic sensors and the true or false labels for the to-be-processed obstacle coordinates collected by the ultrasonic sensors, where N is a positive integer smaller than the total number of the ultrasonic sensors in the ultrasonic sensor array.

10. The electronic device according to claim 7, wherein the neural network model is a convolutional neural network model.

11. The electronic device according to claim 7, wherein the neural network model is a Long Short-Term Memory neural network model.

12. The electronic device according to claim 8, wherein the processing the obstacle coordinates collected by the ultrasonic sensors in the ultrasonic sensor array according to the true or false labels comprises:

if the labelling result output by the neural network model is true, retain the to-be-processed obstacle coordinates collected by ultrasonic sensors;

if the labelling result output by the neural network model is false, discard the to-be-processed obstacle coordinates collected by ultrasonic sensors.

13. A non-transitory computer-readable storage medium storing computer instructions therein, wherein the computer instructions are used to cause the computer to perform an obstacle detection result of an ultrasonic sensor array of an unmanned vehicle, wherein the method comprises:

obtaining obstacle coordinates collected by ultrasonic sensors in the ultrasonic sensor array;

inputting the obstacle coordinates collected by ultrasonic sensors in the ultrasonic sensor array into a pre-trained neural network model, to obtain true or false labels for the obstacle coordinates collected by the ultrasonic sensors output by the pre-trained neural network model;

processing the obstacle coordinates collected by the ultrasonic sensors in the ultrasonic sensor array according to the true or false labels, and control the unmanned vehicle to avoid obstacle according to the processed obstacle coordinates, wherein the neural network model is trained by the following steps:

building an obstacle test scenario;

obtaining and unifying the obstacle coordinates collected by the ultrasonic sensors in the ultrasonic sensor array and the coordinates of the same obstacle collected by a LiDAR into a reference coordinate system;

performing true or false labelling for the obstacle coordinates collected by the ultrasonic sensors according to the obstacle coordinates collected by the unified LiDAR, and generating training samples;

training the neural network model according to the training samples, wherein the performing true or false labelling for the obstacle coordinates collected by the ultrasonic sensors according to the obstacle coordinates collected by the unified LiDAR comprises:

if an error between the obstacle coordinates collected by the LiDAR and the obstacle coordinates collected by the ultrasonic sensors is within a preset threshold range, labelling the obstacle coordinates as true; if the error is greater than the preset threshold range, labelling the obstacle coordinates as false.

14. The non-transitory computer-readable storage medium according to claim 13, wherein the inputting the obstacle coordinates collected by ultrasonic sensors in the ultrasonic sensor array into a pre-trained neural network model comprises:

selecting feature values of to-be-processed obstacle coordinates collected by an ultrasonic sensor and its adjacent N ultrasonic sensors to generate a data sequence, where N is a positive integer smaller than the total number of the ultrasonic sensors in the ultrasonic sensor array;

inputting the data sequence to the pre-trained neural network model.

\* \* \* \* \*